United States Patent [19]

Yeomans et al.

[11] 4,394,685

[45] Jul. 19, 1983

[54] INTERFACE FOR OPERATING A DOT MATRIX PRINTER FOR PRINTING A VIDEO IMAGE

[75] Inventors: David Yeomans, Portmarnock, Ireland; Christopher J. Wilkinson, Cronborough, England; Damien McCartney, Drogheda; Micheal O'Dwyer, Navan, both of Ireland

[73] Assignee: Centronics Data Computer Corporation, Hudson, N.H.

[21] Appl. No.: 184,079

[22] Filed: Sep. 4, 1980

[51] Int. Cl.³ .............................................. H04N 5/76
[52] U.S. Cl. ..................................... 358/264; 358/296
[58] Field of Search ............... 358/296, 298, 127, 280, 358/264; 360/9, 35; 178/25, 30

[56] References Cited

U.S. PATENT DOCUMENTS

| | | | |
|---|---|---|---|
| 3,573,350 | 4/1971 | Rhee | 360/33 |
| 3,618,032 | 11/1971 | Goldsberry | 340/711 |
| 3,685,039 | 8/1972 | Flanagan . | |
| 3,725,573 | 4/1973 | Wachtel | 360/35 |
| 3,811,007 | 5/1974 | Unger | 358/302 |
| 4,021,608 | 5/1977 | Broden | 340/311 |
| 4,046,471 | 9/1977 | Branham | 358/300 |
| 4,084,195 | 4/1978 | Pereira . | |
| 4,106,061 | 8/1978 | Burnett | 358/298 |
| 4,148,066 | 4/1979 | Saylor . | |
| 4,165,520 | 8/1979 | Wessler et al. . | |
| 4,183,058 | 1/1980 | Taylor | 358/127 |

OTHER PUBLICATIONS

Perkin—Elmer Publication No. 5934-0053-03, Published Apr. 1980.

Nov. 1977 Edition of *Oem Scene*.
Article Appearing in *Computer Design*, Oct. 1977 Issue, pp. 38 and 42.
Article Appearing in *Printout*, Oct. 1977 Edition, pp. 2 and 3.

*Primary Examiner*—Alan Faber
*Attorney, Agent, or Firm*—Kenway & Jenney

[57] ABSTRACT

An electronic interface for operating a dot matrix printer to print a pattern appearing on a television screen employs video-type signals incorporating field and line sync signals, digitized image signals representative of dots of information along each raster line and dot pulses for synchronizing the digitized image signals. Upon receipt of a print request, a line address counter is incremented by each line sync pulse. A second counter, which is incremented each time the line address counter reaches a maximum count, has its count set into a horizontal position counter at the beginning of each line scan and is decremented synchronously with the dot pulses. The sequentially received dot information is loaded serially into a shift register and is transferred byte-wise in parallel into a location in a random access memory identified by the count in the line address counter when the horizontal position counter reaches a zero count. When the line address counter reaches its maximum count, the interface circuitry prints the stored bytes, representing a "slice" of the raster image in an orientation transverse to the direction of the lines comprising the raster image. Successive "slices" are acquired and printed in a similar fashion to collectively create a completed image.

23 Claims, 10 Drawing Figures

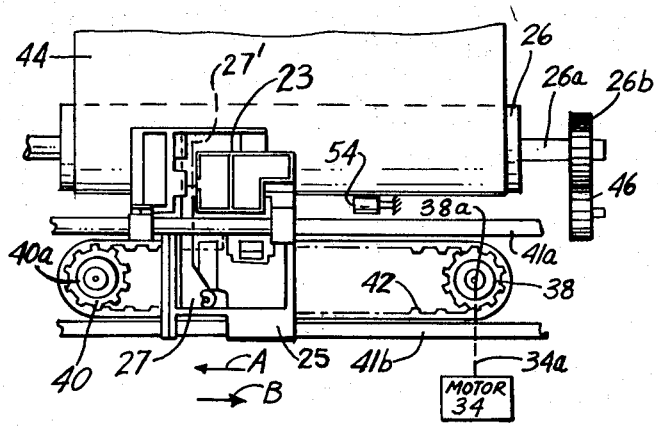
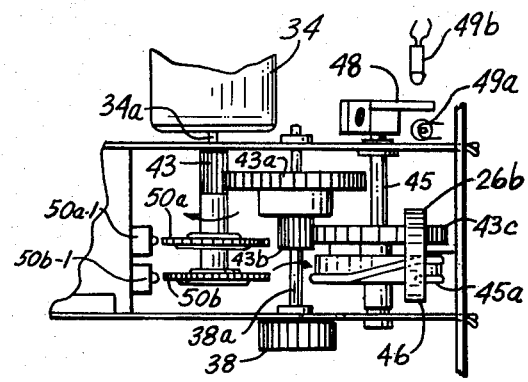
FIG. 2
FIG. 2a
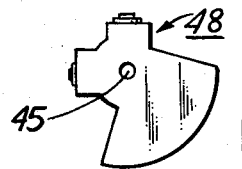
FIG. 2b
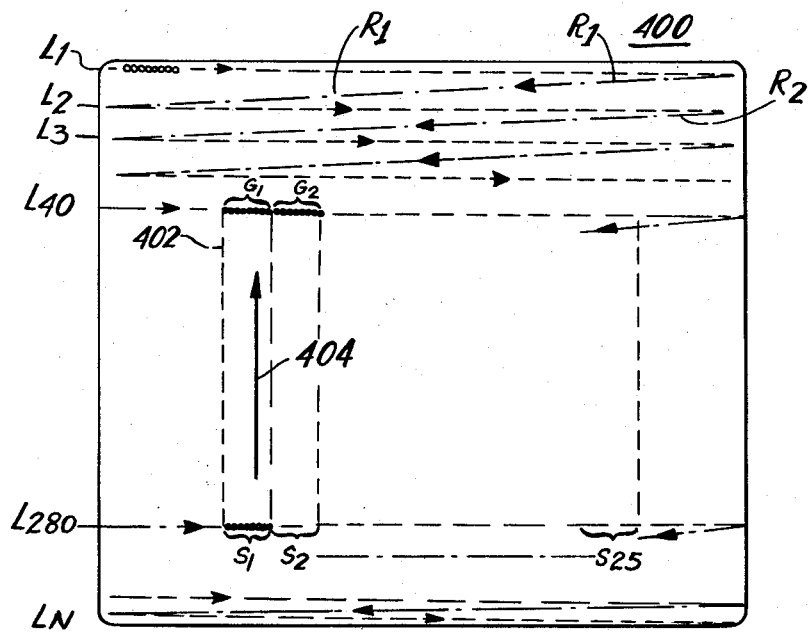
FIG. 3
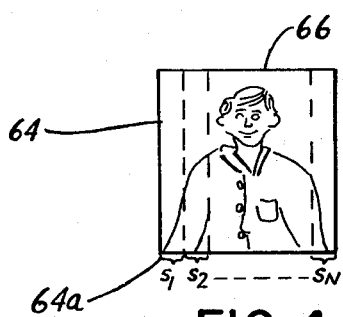
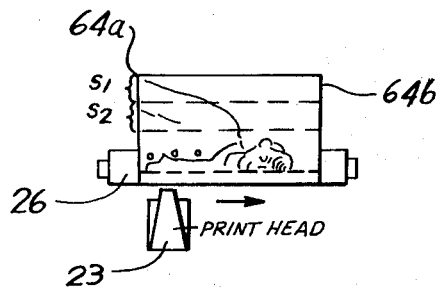
FIG. 4a
FIG. 4b

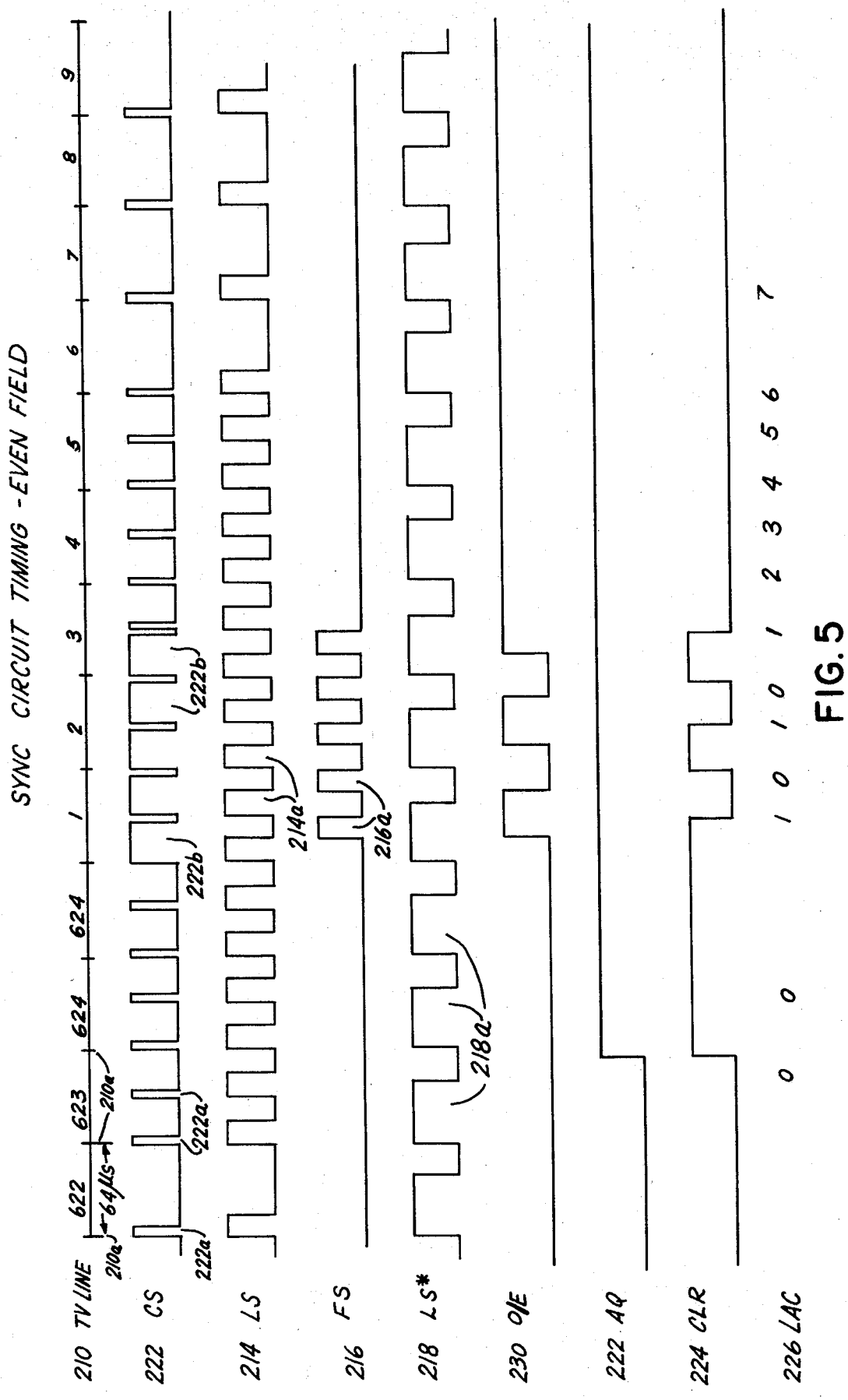

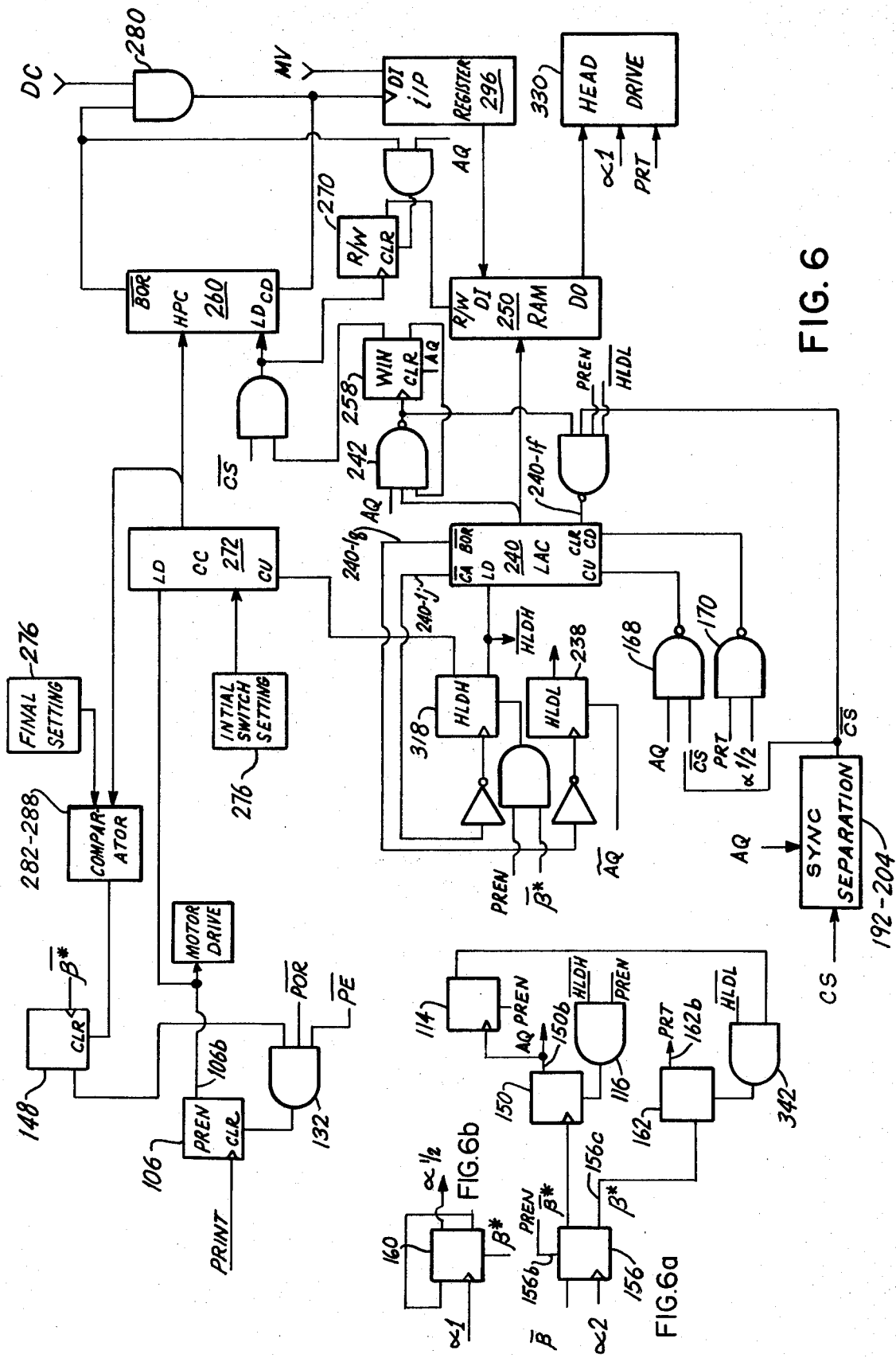

INTERFACE FOR OPERATING A DOT MATRIX PRINTER FOR PRINTING A VIDEO IMAGE

FIELD OF THE INVENTION

The present invention relates to dot matrix printers for printing image information and more particularly to a novel electronic interface for use in operating a dot matrix printer in accordance with video signals applied to the interface circuitry in serial fashion.

BACKGROUND OF THE INVENTION

Communication between remote facilities has grown rapidly through the years and communication techniques have become increasingly more sophisticated. At the present time, it is rather commonplace to communicate with a remote facility through the use of terminals having video display screens. Data is transmitted in a manner substantially identical to that employed in television communications wherein a composite signal is transmitted and is comprised of image information representing each point in the raster, said image information being transmitted in the serial fashion. The composite signal further includes frame and line sync pulses to respectively identify the beginning of each frame of the raster and to identify the beginning of each line of a raster. This technique allows a screen display to be developed quite rapidly. Obviously, the display is continually refreshed, as is also conventional.

Although it is quite convenient to provide a display screen for communication of image information, it is also advantageous to be able to generate a printed copy of the information displayed on the screen for a variety of purposes, such as record keeping, subsequent evaluation, and the like. Techniques have been developed to print data appearing on the screen of the video display device and are presently in use. For example, some of the techniques presently available are disclosed in the following United States Pat. Nos.:

3,685,039 issued Aug. 15, 1972
3,618,032 issued Nov. 2, 1971
4,021,608 issued May 3, 1977
4,165,520 issued Aug. 21, 1979
4,148,066 issued Apr. 3, 1979
4,084,195 issued Apr. 11, 1978

The apparatus employed in the above-mentioned patents is quite complex and expensive. For example, U.S. Pat. No. 4,084,195 requires a very large memory capable of storing information representing all of the dot positions of a complete video raster. Another technique, taught by U.S. Pat. No. 4,165,520, although reducing the storage capability to eight complete lines of dot information, nevertheless requires a rather large size storage capability which, in addition, must be capable of re-circulating the eight lines of data at high speed. Although the technique of the first-mentioned patent is capable of rapidly accumulating image data, the system is large, quite complex and expensive. The technique described in the latter-mentioned patent, although less complex than that described in the first-mentioned patent, is still, nevertheless, complex and requires the use of a tedious technique for accumulating the bits of video information for printing.

BRIEF DESCRIPTION OF THE INVENTION

The present invention is characterized by comprising a method and apparatus for operating a dot matrix printer to print a copy of the data displayed upon a video display device, which technique significantly reduces the size, cost and complexity of the electronic circuitry employed for operating the printer and further reduces the complexity of the printer employed in combination with the interface circuitry.

The present invention utilizes a random access memory (RAM) of significantly reduced storage capability and size as compared with the memories utilized in conventional systems, thus reducing both the size and complexity of the electronic circuitry.

The present invention is comprised of means for receiving composite sync signals incorporating frame and line sync pulses; monochrome video signals, preferably previously digitized and representative of image data for each dot position along each line of a raster; and dot clock pulses utilized to accurately identify the duration of each dot signal.

The composite sync signal is examined by circuitry capable of detecting the presence of even field sync pulses. The said field sync pulses clear a line address counter which is enabled to count up from a zero count upon the occurrence of each succeeding line sync pulse. The print request signal also enables a column counter which sets its count which count is set into a horizontal position counter. The horizontal position counter is decremented by the timing pulses of the received dot clock signal. Simultaneously therewith, the individual bit signals of the monochrome video signal are serially loaded into a shift register which continuously applies its contents to the data inputs of the aforementioned RAM. The memory position accessed is controlled by the line address counter, whose outputs are coupled to the address inputs of the RAM. The transfer of data to the aforesaid shift register is terminated as soon as the horizontal position counter steps down to a zero count, the contents of the location in RAM presently addressed being the binary states of the last eight bits loaded into the shift register, said eight bits effectively being loaded into RAM in parallel fashion. Each successive line sync pulse advances the count in the line address counter and loads the contents of the column counter into the horizontal position counter causing a group of eight bits in the same horizontal position of each successive line of the raster to be loaded into memory for each such successive line. The RAM address is incremented in accordance with the count of the line address counter at the same time that the horizontal position counter is reloaded with the contents of the column counter.

When the line address counter reaches a predetermined maximum count, it is retained at this count in readiness for initiation of the print cycle and also increments the column counter by one count.

During the print cycle the print head carriage is moved across the paper-supporting platen. Registration means which cooperates with the motor drive for the printer, generates registration pulses during movement of the print head carriage. The registration pulses are applied to the line address counter causing the line address counter to be decremented during the occurrence of each registration pulse. Simultaneously therewith, the printing stylii of the dot matrix print head are enabled, by the contents of the location in RAM coupled thereto, to print the byte in RAM at the memory location identified by the present count of the line address counter.

When the line address counter reaches a zero count, the line address counter is held at the zero count and the next data acquisition cycle is initiated.

The novel technique described hereinabove makes highly efficient use of the printer by printing successive "slices" of the raster image, which "slices" are oriented at a right angle to the lines forming the video image. This is an extremely advantageous technique since each line sync pulse automatically serves as a means for developing an address for each group of eight dots stored in memory, thus greatly simplifying the acquisition and printing of data. Also, the novel technique described herein eliminates the need for providing a printer with a character generator and the necessary counter means, gates, etc., associated therewith.

BRIEF DESCRIPTION OF THE FIGURES AND OBJECTS OF THE INVENTION

It is, therefore, one object of the present invention to provide novel method and apparatus for controlling a printer of the dot matrix type in accordance with TV-type signals wherein the technique employed significantly reduces the amount of memory required for the interface circuitry.

Still another object of the present invention is to provide a novel method and apparatus for operating a printer of the dot matrix type under control of video-type signals, wherein the printer is controlled to print successive "slices" of the video image, said "slices" being oriented at a right angle relative to the lines of dot information making up the raster image.

Still another object of the present invention is to provide a novel method and apparatus for operating a printer of the dot matrix type under control of TV-type signals wherein line sync pulses are utilized to develop addresses for storing successive bytes of dot information to be printed.

Still another object of the present invention is to provide an electronics interface employing a random access memory of remarkably small size for operating a printer to print the graphic information generated by TV-type signals.

Still another object of the present invention is to provide a novel method and apparatus by which dot synchronizing signals and composite sync signals are used to select data from a monochrome video signal for printing in such a way that the electronics for operating the printer is greatly simplified.

Still another object of the present invention is to provide a novel method and apparatus for operating a printer of the dot matrix type under control of TV-type signals wherein frame sync pulses are utilized in a unique manner to control the selection of successive "slices" of the raster image for printing, said "slices" being arranged at a right angle to the lines making up the raster image.

Still another object of the present invention is to provide a novel method and apparatus for operating a printer under control of TV-type signals wherein a single memory of remarkably reduced size is employed for acquiring the data to be printed and thereafter for controlling the data to be printed.

The above, as well as other objects of the present invention, will become apparent when reading the accompanying description and drawing in which:

FIGS. 1a and 1b, when taken together, represent a schematic diagram of an interface for operating a printer under control of TV-type signals.

FIGS. 2, 2a and 2b show simplified views of a printer operated under control of the interface circuitry shown in FIGS. 1a and 1b.

FIG. 3 shows a simplified view of a raster image which is useful in describing the operation of the present invention.

FIGS. 4a and 4b respectively show simplified plan views of a raster image and a printer output which are useful in describing the novel operating features of the present invention.

FIG. 5 shows a plurality of waveforms useful in describing the operation of the present invention.

Figure 1A:
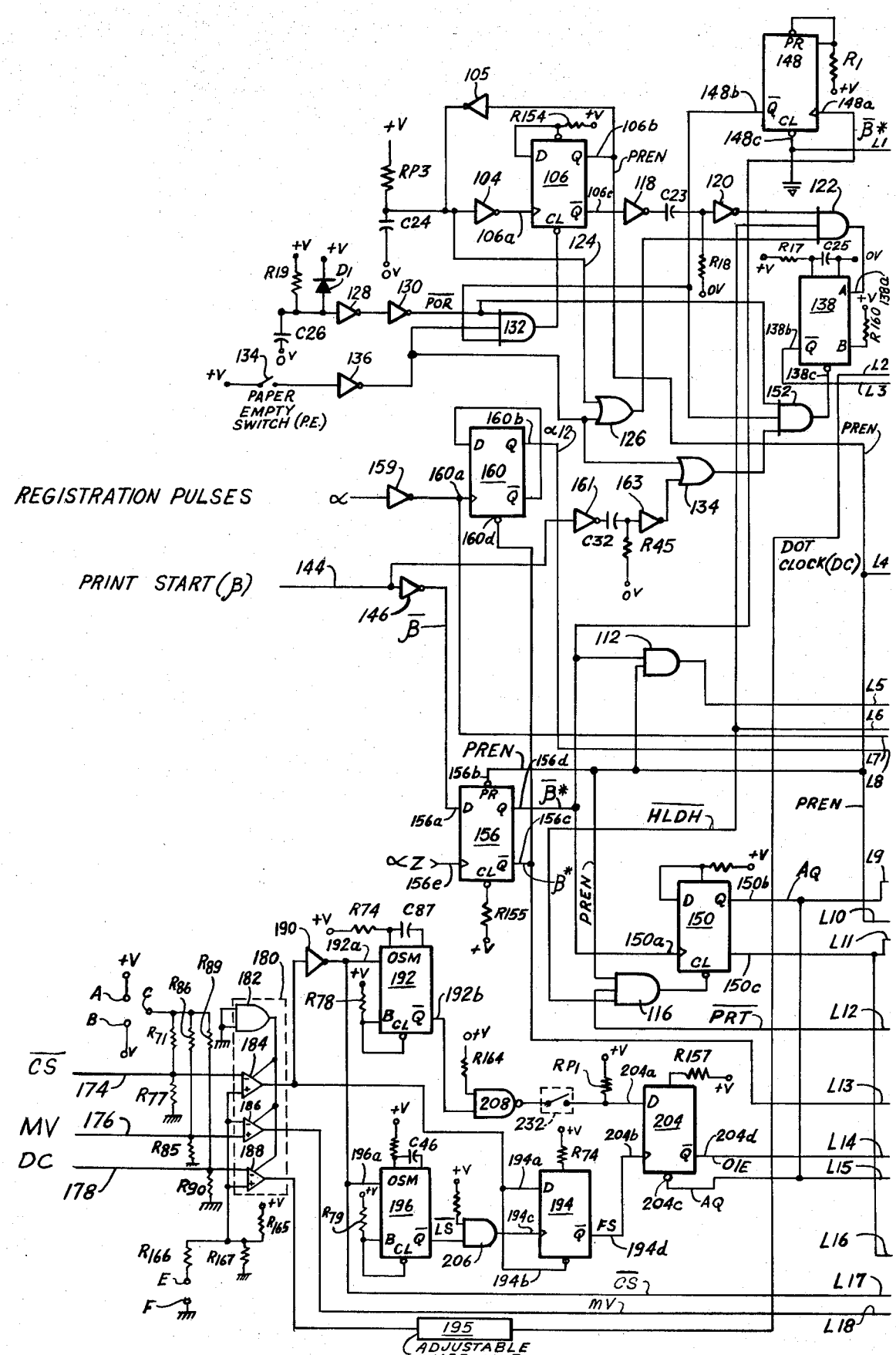
Figure 1B:
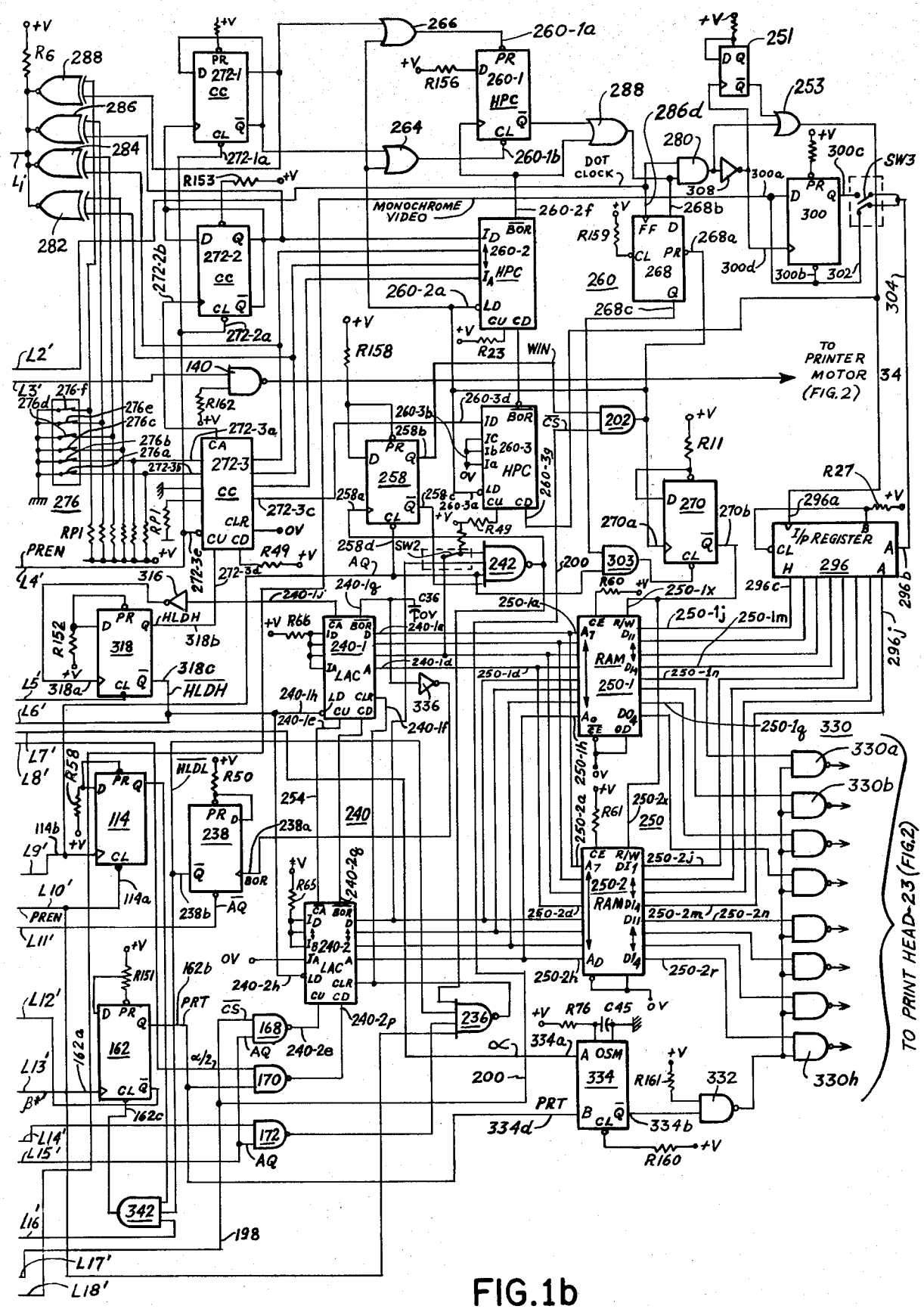

FIGS. 6, 6a, and 6b are is a simplified block diagram of the interface circuit of FIGS. 1a and 1b.

DETAILED DESCRIPTION OF THE BEST MODE OF THE INVENTION

FIGS. 1a and 1b, when taken together, comprise an electronic solid state interface 10 for operating a printer 20 designed in accordance with the principles of the present invention. The printer 20, shown in FIG. 2, is a dot matrix printer which derives each eight-bit byte of dot information from a random access memory RAM 250 which will be described in greater detail in connection with FIGS. 1a and 1b. A byte is applied from RAM 250 in parallel to the print wire stylii forming the print head 23. The print head is formed of tungsten stylii positioned adjacent to the surface of a paper web coated with a film of metal, such as aluminum. The platen includes grounding means for grounding the metal coating. A voltage is selectively coupled to the stylii. The voltage is sufficient to locally vaporize the coating in the immediate region of the stylus to expose the black subsurface and thereby form a dot. The dots so formed collectively define a graphic pattern. The printer employed may, for example, be a Centronics Model P1.

A motor control signal, to be more fully described, energizes motor 34 whose output 34a is coupled to the input shaft 40a of a print head carriage closed-loop drive belt 42 entrained about a pair of pulleys 38 and 40 mounted on shafts 38a and 40a, respectively. Print head 23 is mounted upon slider 25 which is slidably mounted upon guide rods 41a, 41b. Slider 25, is mechanically coupled to belt 42 through a slider pin 27, so as to be moved continuously between the left-hand margin and the right-hand margin of paper web 44 during the printing of each line of dot patterns, and thereafter from the right-hand margin back to the left-hand margin.

Slider pin 27 is in the down position when the slider 25 is moving in the direction of arrow A, to move the stylii away from the surface of the metal coated web 44. When slider 25 moves in the opposite direction shown by arrow B, the slider pin 27 moves up to dotted line position 25', urging the stylii into engagement with the coated metallic surface of web 44. As the timing belt 42 carries the slider pin 27 around the left-hand pulley 38, the slider pin 27 rises in its guide and brings the head into contact with the paper. The slider assembly 25 now begins to move from left to right and the print head 23 is ready to start printing. Line feeding occurs just after the slider pin 27 has rounded the right-hand pulley 40.

Considering FIGS. 2 and 2a, gears 43a on motor shaft 34a meshes with gear 43b on pulley gear shaft 38a. Gear 43b on pulley shaft 38a meshes with gear 43c on cam gear shaft 45. Once per revolution of the toothed belt 42, the cam gear 45a rotates a toothed wheel 46 rotatably mounted in shaft 47 on the mechanism frame. Toothed wheel 47 mates with a toothed wheel 25a on the platen shaft 25, so that the platen 26 is caused to rotate through 20° for a line feed operation.

The printer mechanism produces three timing signals to ensure printing occurs at the correct instants. The print start signal $\beta$ is generated by a 90° cam 48 on the cam gear shaft 45. The cam 48 passes between a light source 49a and phototransistor 49b and indicates when the print head 23 is at the left-hand side of the platen 26 and ready to print. On the motor shaft 34a, there are two toothed metallic wheels 50a and 50b. Adjacent to them are two pick-up coils 50a-1 and 50b-1. The coils sense the passing teeth on the wheels 50a, 50b and respectively generate pulses. The first signal $\alpha 1$ indicates when a dot should be printed and 512 of these pulses occur while the print head 23 is in contact with the paper. The second signal $\alpha 2$ is far less frequent, there being only two teeth on wheel 50b. These signals are used to clock the $\beta$ signal through a flip-flop in the interface circuit, as will be more fully described. The leading edge of the resulting modified $\beta$ signal varies much less in position so that the left-hand margin is more uniform on a printout.

A paper-out condition is detected by a small roller 54 engaging the metalized surface of web 44. The web is normally grounded when the web is exhausted, the roller 54 is no longer held to ground and thereby provides a paper-out signal.

Considering FIG. 3, there is shown therein a video raster 400 which, as is well known, is comprised of a plurality of lines L1 through Ln, each line containing video information representative of a predetermined level of brightness. In the present embodiment, said video signal is preferably digitized so as to represent either the presence or the absence of a dot. However, the present invention may be modified to accept non-digitized video data, if desired.

As is conventional, each line making up the raster image is initiated by a line sync pulse which serves to reset a ramp signal generator develop a ramp signal which drives the cathode ray tube electron beam of a video display device from left to right across the screen, as is conventional. Each line sync pulse resets the electron beam to initiate the scanning of the next line. Downward movement from one line to the next is controlled by a second ramp signal generator which is automatically reset by a field pulse, at the end of each field, as is also conventional.

It is conventional in accordance with PAL standards to create a raster image comprised of 625 lines, the odd-numbered lines being traced during alternating field sync pulses and the even-numbered lines being scanned during the intervening set of successive field scan pulses, said lines of the odd and even field being interlaced to form a raster image comprised of a total of 625 lines. In accordance with NTSC standards, a raster image is formed in the same fashion except that the total number of lines forming the image are 525 in number, the odd number of lines being formed between a first set of successive field sync pulses and the even number of lines being formed during the next successive set of field sync pulses and being interlaced with the odd numbered scan lines.

The technique employed in the present invention prints by acquiring a group of eight successive bits from only one of the two interlaced odd and even fields, storing each eight-bit byte for each line in a predetermined address in random access memory and repeating the operation for each successive line, until all of the predetermined number of lines to be printed have been stored in memory. In the preferred embodiment to be more fully described herein, the interface circuit 10 of FIGS. 1a and 1b is designed to operate the printer to print 24 rows of 40 characters per row. Thus, the interface circuitry 10 accepts TV lines 40 through 294 or 8 through 262, for example, as the lines from which image data is accepted for operating the printer. Although this is the technique employed in the preferred embodiment, it should be understood that a greater or lesser number of lines may be printed if desired without departing from the novel scheme of the present invention.

Thus, assuming the selection of lines 40 to 294, the interface 10 initially takes eight bits from line 40 of the 312.$\frac{1}{2}$ line field (even) and stores this eight-bit byte in a predetermined location in RAM 250. The next line sync pulse, indicating receipt of the dot data for the 41st line, advances the line address counter (to be more fully described) and the same eight bits of the 41st line are stored in the next address in memory. This operation is continued until 255 eight-bit bytes have been stored in memory. The interface then awaits print start signal B.

The printer prints the left-hand-most column of the video image, effectively printing sideways on the paper web 44, relative to the image from which the information is being derived. For example, noting FIG. 4a, there is shown therein a picture of a TV image created by the aforementioned horizontal scan lines. Upon the initiation of printing, eight bits of each scan line, constituting the "slice" 64 of image 66 are stored in memory. The printer starts printing at the left-hand margin and prints the eight-bit byte at the lower end 64a of "slice" 64 as it moves from left to right across web 44 so that the lower edge 64a of "slice" 64 is printed at the left-hand margin of web 44 and so the upper edge 64b of "slice" 64 is printed at the right-hand edge of web 44, as shown best in FIG. 4b. Successive "slices" ($S_2$ through $S_N$) of the image raster are printed in a similar fashion. The detailed manner in which printing, in accordance with the above-described scheme, is accomplished, will now be described in connection with FIGS. 1a and 1b.

Printing is initiated when the input to inverter 104 is brought to 0V (e.g. electronic or mechanical switch). A low to high transition occurs at the input 106a of D-type flip-flop 106 causing $\overline{Q}$ output 106b to go high, to develop the print enable signal PREN which is coupled to: the preset input 156b of bistable flip-flop 156, one input of AND gate 116, one input of AND gate 112, the clear input 114a of bistable flip-flop 114; one input of NAND gate 236; and the clear inputs 272-1a, 272-2a and the load input 272-3c of column counter 272. The Q output 106c of D-type flip-flop 106 is coupled through inverters 118 and 120 to one input of AND gate 122.

The grounding of input 104 further couples ground potential through line 124 to one input of OR-gate 126. An automatic reset signal is developed upon a power on condition, designated as the power on reset signal, $\overline{POR}$. The power on reset signal $\overline{POR}$ is developed by the circuit comprised of capacitor C26 coupled between ground potential and one input of inverter 128. Resistor R19 is coupled between +5 volts d.c. and the input to inverter 128. Diode D1 is coupled between +5 volts d.c. and the input of inverter 28. During the power on condition, capacitor C26, which initially has zero volts across its terminals, maintains zero voltage at the input of Schmitt circuit 128 immediately after energization of the d.c. source, causing the output of inverter 128 to go high and, in turn, causing the output of inverter 130 to go low. This condition is applied to one input of AND gate 132 and one input of AND gate 152. A paper empty switch 134 engages the surface of the paper to ascertain the presence of paper to remain normally open, closes in the absence of paper to apply a 5-volt d.c. level to the input of inverter 136, whose output is coupled to one input of AND gate 132; one input of OR-gate 126; and one input of OR-gate 134. AND gate 132 clears bistable flip-flop 106 in the event that any of the conditions, i.e. the power on or paper empty condition, occurs, to remove the print enable signal PREN.

The output of OR gate 126 goes to one input of AND gate 122. AND gate 122, when enabled, as will be more fully described, applies a signal to the input 138a of one-shot multivibrator 138 causing its Q output 138b to go high, which level is applied to NAND gate 140 to develop a motor energizing output when the output of NAND gate 140 goes low.

The signal PREN is coupled to sections 272-1 through 272-3 of column counter 272 to set column counter 272 preparatory to a printing operation.

The application of a print start signal $\beta$ applied to input line 144 is inverted by inverter 146 and applied to the D-input 156a of flip-flop 156. The $\alpha 2$ signal is applied to the clock input 156e causing the $\overline{Q}$-output 156d to go high. This signal is applied to: input 148a of D-type flip-flop 148, one input of AND gate 112, and input 150a of D-type flip-flop 150. The application of the print start signal $\beta^*$ to input 148a of bistable flip-flop 148 causes its Q output 148b to go high, to apply a high level to one input of AND gate 152, and one input of AND gate 132.

The print start signal $\overline{\beta}$ is applied through inverter 146 to input 156a of D-type flip-flop 156. Output 156d of bistable flip-flop 156 applies a clock signal to input 150a of flip-flop 150 causing the signal AQ to be developed at output 150b. Output 150b is coupled to: input 114b of bistable flip-flop 114; clear input 204c of D-type flip-flop 204; one input of NAND gate 242; the clear input 258d of flip-flop 258; and one input of the AND gates 168 and 172, respectively, which gates 168 and 172 are now enabled. Gate 168 is adapted to receive the composite sync signals $\overline{CS}$ applied at input 174. The signals to be operated upon by interface 10 constitute the composite sync signal $\overline{CS}$ 174 which is comprised of field sync pulses and line sync pulses of the type conventionally utilized in TV transmission. The digitized image data information hereinafter referred to as monochrome video signal MV, are applied to input 176 and constitute digitized information representative of the dots to be printed on each line of the raster image. A dot clock signal DC is applied to input line 178 and constitutes a clock signal synchronized with the dots on the raster image.

The input lines 174, 176 and 178 are coupled to respective inputs of a Quad differential receiver, preferably of the type DS26LS32, which receiver 180 is comprised of gate 182 and differential amplifiers 184, 186 and 188. The differential receiver provides excellent noise immunity coupled with high input sensitivity.

Input 176 and 178 are each coupled to the (+) inputs of differential amplifiers 186 and 188 respectively. Input 174 is coupled to the (−) input of amplifier 174. The (+) input terminal of amplifiers 184 and 188 are each coupled in common to a voltage divider circuit comprised of resistors R165, R167 and R166. The (−) inputs of amplifiers 184 and 188 are coupled to a voltage divider circuit comprised of resistors R71-R77 and R89-R90. The voltage divider R86-R85 is coupled to the (+) input of amplifier 186. With common terminal C coupled to terminal A, the potential divider circuits form a matching network which meet the characteristic impedance of the input signal cable which limits the normal TTL logic high level to a nominal of 2.5 volts.

The potential dividers determine the voltage threshold setting, at which point a comparison is made between the incoming signal level and the reference voltage level. In the TTL configuration, this threshold point is preferably set to a value somewhat in excess of one volt. Thus, an incoming signal in excess of the threshold level will be considered to have assumed a logic high "1" state and an incoming signal below the aforesaid threshold level is assumed to indicate a logic low "0" state.

Coupling common terminal C to terminal B which is maintained at zero volts, the configuration matches the incoming signal cable characteristic impedance for one volt input levels. In order to set the correct threshold reference point which is of the order of a fraction of a volt, terminal E is connected to terminal F. Thus, any incoming signals above the lower threshold level are considered to be logic high "1" state, while any signals below the lowered threshold level are considered to be logic low "0" state.

The composite sync signal CS is coupled through the output of differential amplifier 184 through inverter 190 to input 192a of one-shot 192. The composite sync signal is further coupled to the D input 194a and the clear input 194b of D-type flip-flop 194. The output of inverter 190 is coupled to input 196a of one-shot 196 and is further coupled to one input of NAND gate 168 through lead line 198 and to one input of AND gate 202 through lead line 200.

One-shots 192 and 196, together with bistable flip-flop 194, and AND gate 206 comprise a field sync pulse extraction circuit.

Considering the waveform diagrams of FIG. 5, line 210 represents the TV line with the spacing between each adjacent pair of graduations comprising one TV line, for example line 210 shows field lines 622 through 625, at the completion of one frame and shows field lines 1 through 9 at the beginning of the next frame, each field line having a duration of 64 microseconds.

Waveform 222 represents the composite sync signals. The pulses 222a have a pulse width of the order of 4.70 microseconds. The beginning of an even field frame is distinguished by the broad pulses 222b of waveform 222. In the example given, five such pulses are transmitted during the course of the first three lines of the even field. As was indicated hereinabove, the time interval of each line scan is 64 microseconds. The time interval of a broad pulse 222b, together with the dead space between the trailing edge of each broad pulse and the leading edge of the next broad pulse is 32 microseconds, so that two broad pulses plus their following dead spaces may be transmitted during a single line scan.

The leading edge of each broad pulse 222b in the composite sync waveform is applied to the one-shots 192 and 196. One-shot 192 outputs a pulse having a pulse width of approximately 40 microseconds at 192b, said signal being applied to NAND gate 208. The output of gate 208 is coupled through switch 232 to input 204a of bistable flip-flop 204. One-shot 196 develops a line sync signal having a pulse duration of the order of 17 microseconds, said signal being applied to input 194c of flip-flop 194 through gate 206. The $\overline{Q}$ output 194d of flip-flop 194 is coupled to input 204b of bistable flip-flop 204.

As can best be appreciated from a consideration of waveforms 210 through 230, one-shot 196 develops the line sync pulses 214a comprising waveform 214. The field sync signals are developed by bistable flip-flop 194 wherein the leading edge of the broad pulses develops a low level at output 194d. When the trailing edge of a line sync pulse (i.e. when the leading edge of an inverted line sync pulse) is applied to input 194c, the frame sync pulses are developed at the output 194d. The 40 microsecond pulses which are characterized as broadened line sync pulses LS*/218a comprising waveform 218, are applied to input 204a of bistable flip-flop 204. When the D input 204 is high and the frame sync input at 204b goes high, output 204d develops the odd-even field initiation signals O/E which are applied to one input of gate 172.

The level of the data acquisition signal AQ shown in waveform 222 goes high upon grounding of the input of inverter 104 and $\beta$ going low, as was explained hereinabove. The clear signal CLR of waveform 224 represents the clear signal applied to line address counter 240 as a result of the signal O/E (waveform 230). The counts developed by line address counter 240 responsive to line sync signals (waveform 214) are shown along line 226 and below waveform 224.

As was pointed out hereinabove, the $\overline{\beta}$ signal developed at output 156b of bistable flip-flop 156 is coupled to input 150a of bistable flip-flop 150 to develop the required data signal AQ at output 150b, said waveform being shown at 222 in FIG. 5. The high level developed at output 150b, as was mentioned hereinabove, enables gates 168 and 172. The O/E signal is thus passed by gate 172 to one input of gate 236. The print enable signal PREN is coupled to a second input of gate 236 from the output 106b of bistable flip-flop 106. A third input to AND gate 236 is derived from the Q output 238b of bistable flip-flop 238 which receives a borrow signal $\overline{BOR}$ from the borrow output of line address counter 240 through inverter 336, which borrow output will be described in detail hereinbelow. For the purposes of the present explanation, it is sufficient to understand that the borrow output is developed when line address counter 240 has counted down to a zero count which is the state of line address counter 240 just prior to the acquisition of data.

When all of these signals are present at the input of gate 236, the output of gate 236 goes low, removing a clear condition from line address counter 240 which is shown as being comprised of a pair of integrated circuit elements each being capable of counting up to a maximum of 16 in binary form, so that when taken together, counter 240 has the capability of counting from zero through 255 in binary form. The outputs 240-1a through 240-1d of stage 240-1 are coupled to address inputs 250-1a through 250-1d of RAM section 250-1 and to address inputs 250-2a through 250-2d of RAM section 250-2, while the outputs 240-2a through 240-2d are coupled to the address inputs 250-1e through 250-1h and inputs 250-2e through 250-2h of RAM sections 250-1 and 250-2. The RAM 250 is comprised of two individual memory chips or sections 250-1 and 250-2 each capable of storing 256 4-bit binary words, each memory location therein being identified by the 8-bit addresses coupled to the address inputs 250-1a through 250-1h and 250-2a through 250-2h. Sections 250-1 and 250-2 together comprise a 256 byte memory of 8-bit bytes.

The line sync pulses contained in composite sync signal $\overline{CS}$ are applied to one input of AND gate 168 whose output is coupled to the count-up input 240-2e of counter 240-2. The count-up input 240-1e of counter section 240-1 is coupled to the output $\overline{CA}$ of section 240-2 through line 254.

Line sync pulses cause the line address counter to count up from zero. As soon as the line address counter 240 reaches a decimal count of 40, in binary form, gate 242, whose inputs are coupled to respective stages of line address counter 240, is enabled at the time that line address counter 240 reaches the count of 40, to enable gate 236 which causes the line address counter 240 to be cleared. Line sync pulses are still being applied thereto allowing the line address counter to again count up from zero. However, the use of gate 242 enables the first 40 lines of the raster scan to be ignored. Obviously, a greater or lesser number of the first lines of each frame may be ignored if desired, simply by appropriate connection of the inputs of gate 242 to respective output stages of the line address counter 240 and/or by opening of switch SW2. The output of gate 242 is also coupled to input 258a of bistable flip-flop 258 causing its output 258b to develop the window signal WIN and to develop a disabling signal at its output 258c to prevent gate 242 from being subsequently enabled during the present counting operation of line address counter 240.

The window signal WIN is applied to one input of gate 202 which is now enabled to pass composite sync signals to: preset input 260-1a and clear input 260-1b of horizontal position counter section 260-1 through OR-gates 266 and 264; load input 260-2a of the horizontal position counter section 260-2; load input 260-3a of section 260-3; the preset input 268a of bistable flip-flop 268; and the input 270a of bistable flip-flop 270.

While the window signal WIN is high, the contents of the column counter 272 comprised of sections 272-1, 272-2 and 272-3, is loaded into the horizontal position counter 260 upon the occurrence of each line sync pulse which is applied to the load inputs of the horizontal position counter by gate 202.

The column counter 272 is comprised of sections 272-1, 272-2 and 272-3. Sections 272-1 and 272-2 are actually bistable flip-flop stages, while section 272-3 is a 4-stage binary counter, said sections, taken together comprising a 6-stage binary counter.

The location at which the left-hand edge of the raster image at which printing is to be initiated is selectable by means of the switch array 276 which operates in cooperation with the column counter 272. Switch array 276 is comprised of switch members 276a through 276f. Switches 276a and 276b selectively couple ground potential to inputs 272-3a and 272-3b respectively of column counter section 272-3 for the purpose of setting the initial value of the column counter. Depending upon the selected connections, the left-hand edge of the image field to be printed by the printer, may be moved further inwardly from the left-hand edge or outwardly and closer to the true left-hand edge of the raster image. Switches 276c through 276f are coupled to respective inputs of exclusive-NOR gates 282, 284, 286 and 288 respectively, said exclusive-NOR gates having the remaining inputs coupled to selected outputs (in the preferred embodiment, the top four outputs) of column counter 272 to apply a clear signal to clear input 148c of bistable flip-flop 148 when the outputs of the stages of column counter 272 compare with the switch settings of switches 276c through 276f whereby the right-hand edge of the raster image may be adjusted inwardly from the true right-hand edge of the actual TV image.

The count within the column counter 272 is loaded into the horizontal position counter on the occurrence of each line sync pulse, the count being entered into the horizontal position counter 260 being eight times the actual count contained in the column counter 272. For example, if the count in column counter 272 is 1, the count entered into horizontal position counter 260 is 8; if the count in column counter is 2, the count loaded into horizontal position counter 260 is 16; and so forth. This arrangement is obtained by permanently wiring the $2^0$, $2^1$ and $2^2$ inputs 260-3e through 260-3g of horizontal position counter section 260-3 to ground potential, while coupling the $2^0$ output stage 272-3c of column counter section 272-3 to the $2^3$ input state 260-3d of horizontal position counter section 260-3.

The dot clock signals DC are passed by gate 280 through differential amplifier 188 and adjustable phase circuit 195, which is adjusted so that the dot clock pulses are in synchronism with the monochrome video signal MV. When the horizontal position counter 260 reaches a zero count, section 260-2 has its borrow output 260-2f coupled to one input of gate 288 and the clock input of HPC section 260-1. In the absence of a borrow signal passed by gate 288 to one input of gate 280, gate 280 is enabled to pass dot clock signals to: the clock input 296a of input register 296; and the count down input, for example the count down input 260-3g of section 260-3 of the horizontal position counter 260. When the borrow signal is present, gate 280 is blocked to prevent any further dot clock signals from being passed by gate 280.

Monochrome video signals MV, which are simultaneously coupled to inputs 300a and 300b of bistable flip-flop 300, are either passed by line 302 when switch SW3 is in its lower position, or passed by the Q output 300c of bistable flip-flop 300 and line 304 to the data input 296b of input register 296, when SW3 is in its upper position.

Bistable flip-flop 300, when connected into the circuit by means of switch SW3, receives dot clock signals from the output of gate 280 and inverter 308 at its input 300d, while receiving monochrome video signals at its inputs 300a and 300b. Bistable flip-flop 300 serves a "rounding" function by developing a high level at its Q output 300c whenever the dot clock pulse goes high with D input 300a high and of developing a low level at its output whenever the dot clock pulse goes low. Thus bistable 300 effectively takes samples on both edges of the DC signal and compares them so that it can ignore half-width rounding dots.

The monochrome video signals MV are applied to input 296b of register 296 and are clocked in upon the occurrence of each dot clock signal DC. Input register 296 serially accepts input data and shifts the data into its input stage and toward its output stage upon the loading of each subsequent dot pulse condition. Input register 296 is comprised of eight stages and constantly shifts the dot information towards, and eventually out of, the output stage of the register, whereby that bit of dot information shifted out of the output stage is lost, in order to be able to accept the next bit of dot information in its input stage.

Simultaneously with this operation, the dot pulses of the dot clock signal DC decrement horizontal position counter 260. One-half of a DC cycle after horizontal position counter 260 reaches a count of zero, the last eight bits of dot information loaded into input register 296 appear at outputs 296c through 296j, which outputs are coupled to data inputs 250-1j through 250-1m of RAM section 250-1 and 250-2j through 250-2m of RAM section 250-2. These eight bits of dot information are written into RAM 250 at the address location determined by the count in line address counter 240. The RAM 250 is maintained in a write mode by the output 270b of bistable flip-flop 270 which maintains the proper signal level for the write mode.

Ram 250 is written into from line sync pulse until half DC cycle after BOR signal of HPC 260 is generated ($\frac{1}{2}$ cycle also allows data to settle into RAM 250 after last DC positive edge).

When horizontal position counter 260 reaches a zero count, the level at its borrow output 260-2f prevents gate 288 from enabling gate 280. Thus gate 280 is prevented from passing dot clock pulses DC to input register 296, even though monochrome video signals MV may continue to be applied to the load input 296b. Thus, regardless of the number of counts of eight which the horizontal position counter 260 steps through, only the dot bits loaded into input register 296 during the final count of eight are loaded into RAM 250. The address location at which the eight bits of dot information are entered into is dependent upon the count developed by line address counter 240.

The occurrence of the next line sync signal LS advances the count of line address counter 240 applying the next successive address to the address inputs of RAM 250. Simultaneously therewith, the contents of the column counter 272 are again loaded into the horizontal position counter 260. Each successive line sync pulse is handled in a similar manner.

When the line address counter 240 reaches its maximum count, i.e. a count of 255 (with 255 8-bit bytes having been loaded into RAM 250, one from each of the TV lines 40 through 294), a carry signal is generated at the carry output 240-1j. This carry signal is coupled through inverter 316 to input 318a of bistable flip-flop 318 to develop a "hold high" signal HLDH at output 318b and an inverted "hold high" signal $\overline{HLDH}$ at output 318c which is coupled to the "Load" inputs 240-1h and 240-2h of line address counter sections 240-1 and 240-2 and which is further coupled to one input of gate 116 and one input of gate 122. The signal at output 318b of bistable flip-flop 318 advances the count of column counter 272, being applied to the countup input 272-3d of column counter section 272-3. This causes the column counter 272 to advance by one count. The level at output 318c of bistable flip-flop 318 holds the line address counter 240 at the count 254 in readiness for the print cycle and, through gate 116, clears the data acquisition signal AQ at output 150b of bistable flip-flop 150. RAM 250 now contains eight bit bytes of successive dot information from each of 255 lines of the raster image and line address counter 240 is retained at the count 254 in readiness for the print cycle.

The print cycle is initiated when $\beta^*$ goes high at output 156c of flip-flop 156, causing the signal PRT, appearing at output 162b of bistable flip-flop 162 to develop the print signal PRT which is applied to one input of gate 170 to enable gate 170 to pass $\alpha/2$ signals to the count-down input 240-2p of the line address counter 240.

$\beta/2$ pulses are derived from output 160b of bistable flip-flop 160 whose input 160a receives $\beta$ pulses from the printer through inverter 159, said $\beta$ pulses being the pulses derived from back-up coil 50a-1 (FIG. 2), each pulse identifying the precise location at which a dot column pattern is to be printed.

Thus, the line address counter 240 is counted down by every second $\alpha$ pulse, i.e. is counted down at one half the rate of the $\beta$ pulses. Bistable flip-flop 270 has its output 270b reversed to place RAM 250 in the "read" condition whereupon the count of line address counter 240 which is now being counted down from a count of 254 towards zero, causes the 8-bit byte of dot information appearing at the address applied to RAM 250 by line address counter 240, to be developed at the data output terminals 250-1n through 250-1q and 250-2n through 250-2q of the RAM sections 250-1 and 250-2 respectively. These outputs are each coupled to an associated input of the gate array 330 comprised of gates 330a through 330h. The remaining inputs of gates 330a through 330h are coupled in common to the output of NAND gate 332. One input of NAND gate 332 is maintained at a high level. The remaining input is coupled to the output 334b of one-shot multivibrator 334 which receives $\alpha$ pulses at its input 334a. Upon the occurrence of each pulse, and in the presence of a print signal PRT at input 334d, which $\alpha$ pulses occur twice as frequently as each $\alpha/2$ pulse, the byte of dot information appearing at the data output terminals of RAM 250 is passed by gates 330a through 330h to the stylii of printer head assembly 23. Thus, each 8-bit byte of dot information is printed twice. At every $\alpha$ pulse, the solenoids of the print head assembly 23 are enabled to print the byte appearing at the data output terminals of RAM 250 for a duration determined by one-shot multivibrator 334.

Line address counter 240 counts down at half the $\alpha$ pulse rate, i.e. of the $\alpha/2$ rate, causing the 8-bit byte in each succeedingly lower memory position to be printed twice. When the line address counter reaches a count of zero, a borrow signal is generated at output 250-1q of line address counter section 240-1. This signal is passed by inverter 336 to input 238a of bistable flip-flop 238 which develops the "hold-low" signal $\overline{HLDL}$ at output 238b which is coupled through gate 236 to hold the line address counter 240 at the zero count and which is coupled through gate 342 to the clear input 162-c of bistable flip-flop 162 to remove the print signal PRT from output 162b to terminate the printing phase of the cycle.

Recapitulating the operation of the interface circuitry 10 in conjunction with FIGS. 3, 4a and 4b, FIG. 3 shows a simplified view of a raster image 400 comprised of lines L1 through Ln. A new field (either odd or even) begins in the upper left-hand corner of the raster image region 400 as line L1. In the example given wherein the monochrome video information is in digitized form, the image information of lines L1 through Ln are each comprised of a plurality of dot positions with each dot position being either black or white, for example. The sweep of the electron beam begins in the upper left-hand corner to scan line L1 and develop the dot information of the appropriate contrast. At the end of line L1 which occurs at the right-hand edge of the raster image region 400, the line sync signal causes the electron beam to be rapidly returnd to the left-hand edge of the raster image region 400 as is represented by return line R1. The dot information for line L2 is then displayed by causing the electron beam to scan from the left-hand edge to the right-hand edge of the raster image region 400 and simultaneously therewith, the electron beam is modulated in accordance with the digitized dot information. It should be understood that the lines L1 through Ln are actually in very close proximity to one another and the spacing shown in FIG. 3 is only for purposes of simplifying an understanding of the present invention. As is well known, the electron beam is caused to scan from left to right and to be reset from right to left by means of a deflection device. Simultaneously therewith, the electron beam is caused to scan from top to bottom and then to be rapidly reset by moving from the bottom to the top of region 400 by a second deflection means, as is conventional. The second or vertical deflection means typically returns the electron beam to the top edge of the raster image region 400 upon the occurrence of a field sync pulse, as is conventional. Thus, the electron beam is scanned from left to right by the first-mentioned deflection means and is also caused to move downwardly simultaneously while it is being scanned from left to right by the second-mentioned deflection means.

As was mentioned hereinabove, a first predetermined group of lines of the raster image and a last group of lines of the raster image may be ignored for purposes of printing data. Further, as was mentioned hereinabove, by the setting of the switches in switch array 276 shown in FIGS. 1a and 1b, the left-hand and right-hand edges of the region in which printing is to take place may also be selected. Thus, the dotted rectangle 402 shown in FIG. 3 represents the region in which dot information will be accepted for printing purposes. Thus, for example, considering line L40 as the first line containing image information which will be transferred to the printer, the first group G1 of 8-bits of line 40 is the first byte to be stored in the first address location of RAM 250. This is accomplished as was described hereinabove by resetting line address counter 240 when it reaches a count of 40, to select line L40 and by setting the switches in switch array 276 to control the column count which is loaded from column counter 272 into the horizontal position counter 260. Let it be assumed that the first two groups of 8-bits of line L40 are to be ignored and that no digitized image data is to be loaded into memory until the third group of eight digitized bits is transferred to interface 10 from the image generating source. Under these circumstances, a count of 24 is loaded into horizontal position counter 260 from column counter 272. Horizontal position counter 260 thus begins to count down from a count of 24. The first group of 8-bits of dot information are loaded into input register 296, followed by the second 8-bits, which serve to cause the first 8-bits of digitized dot information to be dumped from register 296. The third group of digitized dot information is then serially loaded into input register 296 causing the dot information of the second group of 8-bits to be dumped thereform. As soon as horizontal position counter 260 reaches a count of zero, dot clock pulses are prohibited from passing to the clock input 296a of input register 296 enabling the last 8-bits of digitized dot information to be transferred from shift register 296 to, and retained in, RAM 250. This operation is repeated for each line L41 through L294, for example, wherein only the third group of 8-bits of each of such lines is loaded into successive locations in RAM 250.

During the printing phase of the cycle, printing is undertaken by the printing 20 while the print head 23 moves from left to right (see FIG. 2). Printing occurs while reading out the 8-bit byte last loaded into RAM 250 and occupying the highest address therein. This 8-bit byte constitutes the group G1 of digitized dot information of line L294 shown in FIG. 3. This 8-bit byte is transferred in parallel to the eight solenoids of the print head assembly 23. Thus printing occurs from left to right across the paper web 44 in the direction of the group G1 of line 288 upwardly as represented by arrow 404 in FIG. 3 with successive groups G1 being printed until the last group G1 of line L40 is printed. From a consideration of FIGS. 4a and 4b, printing may be characterized as occurring "sideways" relative to the image being printed, wherein a vertical "stripe" of the image in region 402, the first vertical "stripe" being identified as S1 in FIG. 3, is printed in "sideways" fashion from left to right across the printer. The second "slice" 52 of the image in region 402 is loaded into RAM 250 of interface 10 in a similar manner wherein the second group of 8-bits of digitized information identified as G2 in FIG. 3, taken from line L40, is the first 8-bit byte loaded into RAM 250. Successive groups G2 of successively higher numbered lines L2 through L288, for example, are loaded into RAM 250 in a similar fashion until RAM 250 is fully loaded, at which time the next "slice" S2 of the image within the region bounded by rectangle 402 is printed by printer 20 immediately beneath, and in registration with, "slice" S1.

The interface will now be summarized in connection with FIGS. 6, 6a, and 6b.

Referring to FIGS. 6, 6a, and 6b, it can be seen that all the information of the Viewdata page occurs in 240 lines of either field. In this printer, the even field is used. In each of these lines there are 240 or 280 dots of data taking up somewhere between 40 and 47 $\mu s$ of the 64 $\mu s$ between line syncs. The screen image printer takes eight bits from each of lines 40 to 294 inclusive of the even field (assuming 625 lines with interlace). The bits taken might, for example, be 73 to 80. This eight-bit column of the Viewdata page is stored in RAM 250 and then printed out. The eight-bit wide column immediately to the right of the first eight-bit column is then acquired and printed. Subsequent columns are acquired and then printed until the full Viewdata page is complete. Note how the image is formed at right angles to the TV picture (see FIGS. 4a, 4b). With 280 dots per line (7×10 matrix) 35 columns are printed and thus the print head 25 performs 35 passes across the paper web. The particular 255 TV lines chosen are such that the 240 data lines of the majority of Viewdata receivers fall within them.

FIGS. 6, 6a, and 6b represent is a simplified block diagram of the control electronics. The various signals will be explained as they are met in the following description. The RAM 250 shown is the one, referred to above, in which the eight-bit column is stored. It has a 256×8 organization. Line address counter 240 is the eight-bit wide RAM address generator. The six-bit column counter (CC) 272 indicates which column of the TV screen is currently being printed. The nine-bit horizontal position counter (HPC) 260 indicates how far in the eight-bit byte should be taken from the line sync pulses.

The column of data is acquired during the period for which signal AQ="1" which is initiated when B* goes to "0". The column is printed out when the PRT signal="1" which begins when B* goes high. Thre is a general enable signal PREN. When low, the PREN line holes various flip-flops and counters in their appropriate initial states. The PREN line is set to zero initially by power-on reset POR. Note that a paper empty condition (PE) disables print. With a "0" to "1" transition on the line PRINT, PREN (106b) goes to "1" which starts the motor (34) which in turn causes the strobes $\alpha 1$, $\alpha 2$ and $\beta$ to occur. The motor may start from rest anywhere (although usually it starts at a point where $\beta^*$ is the "0" as in FIG. 5—the SIP basic training diagram). To insure that the acquisition cycle does not begin until the $\beta^*$ "1" to "0" transition, PREN presets $\overline{\beta^*}$ high (see input 156b of flip-flop 156).

When AQ goes high (output 150b of flip-flop 150), CS is gated through gate 168 to the count up (CU) input of the LAC 240 and the clear (CLR) input is held high by the sync separation circuitry. The sync separation circuitry is so termed because it picks out the field sync pulses from CS. It holds the clear condition on the LAC 240 through gate 236 until the beginning of the next even field. The clear of the LAC 240 having been released, LAC 240 now increments by 1 on the leading edge of every line sync pulse. When a count of 40 is reached, the output of the 4-input NAND gate 242 goes low to reset LAC 240 which brings the output of the NAND gate 242 back high and sets the WIN flip-flop 258. WIN (output 258b) indicates that the lines 40 to 294 "window" is present, during which data will be taken. Note that $\overline{WIN}$ is fed back to the input of the NAND gate 242 to prevent LAC 240 from being reset the second time that the LAC 240 reaches a count of 40. As the LAC 240 is counted up now a byte is stored in RAM 250 for every TV line. The byte applied to RAM 250 comes from a shift register (I/P register 296). The line sync (LS) pulse loads the HPC 260 with eight times the contents of the CC 272. The falling edge of the line sync pulse sets a flip-flop 270 which causes the contents of shift register 296 to be transferred into RAM 250. After the pulse, the dot clock counts down the HPC 260 and shifts data from MV through shift register 296. When the HPC 260 register 296. When the HPC 260 reaches a "0" count, a borrow ($\overline{BOR}$) is generated which blocks data from being shifted through gate 280 into the shift register 296, stops HPC 260 from counting down and terminates the transfer of data to the RAM 250 so that the last eight bits are those stored at whatever address the LAC 240 is currently indicating.

When LAC 240 reaches its highest value of 255, a carry is generated ($\overline{CA}$). This level (240-1j) sets the HLDH flip-flop 318 which HLDH level (318b) increments the CC 272, clears the AQ flip-flop 150 and holds LAC 240 at 254 in readiness for the beginning of the print cycle.

When $\beta^*$ goes high (output 156c), PRT (output 162b of flip-flop 162) goes high. Note that PRT cannot go high until an acquisition cycle AQ has taken place because it is held low by flip-flop 114 that is only set when there is an "0" to "1" transition on AQ. The HLDH flip-flop 318 is also cleared when B* goes high. PRT gates $\alpha\frac{1}{2}$ through to the count down (CD) of the LAC 240. The LAC 240 starts counting down from 254 at every second $\alpha 1$ pulse (it does not count down from 255 because nothing is ever stored at this location). At every $\alpha 1$ pulse, the print head 23 is enabled to print. The reason two dots are printed for every dot stored in RAM 250 is because with the mechanism the horizontal pitch is only half the vertical. The aspect ratio of the TV picture is restored by using $\alpha\frac{1}{2}$ to count down LAC 240. Note that AQ disables the NAND gate 242 from recognizing the count of 40 this time and clears the R/W flip-flop 270 controlling the RAM 250 to prevent writing into it. When the LAC 240 reaches "0", a borrow is generated at 240 1q which sets the HLDL flip-flop 238 which resets the PRT flip-flop 162 through gate 342 and holds LAC 240 at "0" in preparation for the beginning of the next aquisition cycle.

In the next aquisition cycle, CC 272 is one count higher so that the HPC 260 counts down a further eight dot clock cycles before writing into RAM 250 is terminated. When the count of column counter 272 agrees with the setting of DIP switch 276, a comparator 282-288 registers a "1" which on the next β* "1" to "0" transition enables flip-flop 148 to send a clearing pulse to the PREN flip-flop 106 through gate 132 which stops the motor 34 and hence the printing operation. The length of the aquisition cycle depends on where in CS AQ goes high. It is always less than three fields (60 ms) however, which, if AQ went high just after the beginning of an even field, β* is low for about 160 ms so there is no need to stop the motor 34 to acquire data.

Considering FIG. 1b, a flip-flop 25a and OR gate 253 are provided to lock the dot clock off during a line sync and for at least ½ cycle after the falling edge of this pulse. This is done to prevent race hazards in the HPC 260 which will occur if the leading (clocking) edge of dot clock occurs shortly after the LD of the HPC 260 goes high. The $\overline{BOR}$ output 260-2f of HPC 260 is not fed directly to the clear of the RAM R/W flip-flop 270. It is delayed by half a cycle to give the data in shift register 296 time to be transferred into RAM 250.

β* holds th α1 divide by 2 flip-flop 160 clear when it is low. This insures that the signal α½ is always in the same state at the beginning of a print cycle, otherwise successive columns may be printed displaced one α1 pulse from one another. $\overline{PRT}$ is used to clear the AQ flip-flop 150 and $\overline{AQ}$ is used to clear the PRT flip-flop 162, to prevent things from getting out of control if PRT and AQ are both high at the same time.

FIG. 1b shows the switch circuitry 276 for determining the initial and final values of the column counter 272. They are, in fact, switches from an 8-hole DIP switch. From FIG. 1b, it can be seen that switches 276a and 276b determine the initial digital number that PREN loads into the column counter 272. If, for example, 276a is closed and 276b is open, then the initial number in this six-bit counter 272 is 001001 (9) so that the first column taken is bits 65 to 72 inclusive. These switches effectively determine how far from the left-hand side of the TV screen the first column is taken. Switches 276c-276f form one input to the comparator (gates 282-288), the other being the top four bits of the CC 272. If, say, 276c and 276d are closed and 276e and 276f are open, then the final value of the column counter is 110000(48). The last aquisition cycle occurs with the CC 272 at 47, thus the last column taken is bits 369 to 376. These switches in switch array 276 determine how far from the right-hand side of the TV page the last column is taken. Line feeds at the end of the printed page are obtained by taking the last column somewhat to the right of the actual Viewdata page so that some of the (blank) right-hand margin is printed.

There are two more switches on the DIP switch array. Switch 232 (SW1) when open, allows non-interlaced syncs to be used. Instead of five broad pulses and equalizing pulses these syncs only have one broad pulse indicating the beginning of the field. The FS flip-flop 194 detects this pulse and its falling edge takes the CLR level off the LAC 240. Switch SW2 (FIG. 1b) when open, disconnects bit 6 of the LAC 240 from the NAND gate 242 input. This means that data is taken from lines 8 to 262 inclusive. This is used for 525 line systems.

It can thus be seen that the present invention provides a novel electronic circuit which is highly economical from the viewpoint of the limited number of circuits and memory locations required to print an image. In a typical example, the image upon the screen is printed within 15 seconds and typically is constituted of 30 "slices", S1 through S30. The use of line sync pulses which advances the line address counter, coupled with the novel column counter and horizontal position counter, automatically, and in a highly simplified manner, accurately and simply selects the proper 8-bit byte without the need for complex circuitry, each line sync pulse serving as the means for incrementing line address counter 240 which develops the addresses for each location in RAM 250.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method for storing data for use in operating a printer of the dot matrix type from digitized video data comprising a composite sync signal incorporating field and line sync signals, a data signal incorporating digitized image data, and a clock signal incorporating regularly occurring time pulses for use in synchronizing the digitized data signals, said method comprising the steps of:

initiating an acquired data cycle upon detection of a next field signal when the printer is ready to print;

counting line sync signals occurring after the detection of the last-mentioned field sync signal;

counting timing pulses occurring after detection of each line sync signal; and selecting a predetermined portion, less than the whole of the image data of each line, in accordance with the timing pulse count, for storage in a random access memory at locations in the memory determined in accordance with the line count associated with the portion of image data being stored.

2. A method for operating the print head of a printer to print a dot pattern upon a print receiving medium from lines of digitized image data which comprise a composite image, said method comprising the steps of storing a portion of said image in a memory having a plurality of memory locations, each location storing a line portion of and less than one line of digitized image data, said line portions representing a plurality of dot signals, utilizing a composite signal containing field and line sync signals and a timing signal incorporating timing pulses for use in synchronizing said digitized image data, said method further comprising the steps of:

initiating a print cycle when the print head is in position to print;

repeatedly incrementing a line count;

reading out the contents of the memory location associated with said line count each time said line count is incremented;

operating the associated dot generating means of the printer to print in accordance with the dot representing signals stored in each read memory location; and moving the print head across the print receiving medium after each print step.

3. The method of claim 2 further comprising returning the printing element to a starting position preparatory to printing the next line of dot patterns;

storing image data for printing the next line of dot patterns in said memory.

4. The method of claim 2 wherein the image data stored in memory is printed by moving the printing element in a direction transverse to the lines of image data.

5. The method of claim 2 further comprising the steps of detecting the presence of each print position and generating a registration pulse for each print position;

counting the registration pulses;

successively reading out the contents of each memory location associated with each count; and operating the printing element to print a dot pattern in accordance with the image data read out of the memory location.

6. Apparatus for operating a dot matrix printer from a composite video-type signal comprising signals representing image information for each line of a raster image and field and line sync signals, said apparatus comprising:

means for detecting said field sync signals;

first digital counter means for counting line sync signals after the occurrence of a said field sync signal;

memory means having address inputs cooled to said first counter means for selecting a memory location in accordance with the count in said first counter means;

conversion means for converting said image information signals into sequential digital signals;

said memory means including data inputs coupled to the outputs of said conversion means for writing digital signals from said conversion means into a memory location selected in accordance with said first counting means; and second counting and control means for selecting a portion, less than a whole line, of the information of each line of the raster image to transfer into the memory means from said conversion means.

7. The apparatus of claim 6 further comprising means responsive to said first counter means reaching a predetermined count to terminate the loading of digital signals into said memory means and for initiating a print cycle.

8. The apparatus of claim 7 further comprising a print head means;

means for moving said print head means responsive to initiation of a print cycle;

means responsive to movement of said print head means for generating registration pulses;

means responsive to said registration pulses and initiation of said print cycle for causing said first counter means to count in a reverse direction;

means responsive to initialization of said print cycle for placing said memory means in a read mode; and means for coupling each digital signal stored in said memory to said print head means for operating said print head means to print a dot pattern from a said memory location selected in accordance with the count in said first counter means.

9. The apparatus of claim 8 further comprising means responsive to said first counter means reaching a second predetermined count for terminating a said print cycle and initiating a subsequent data acquisition cycle.

10. The apparatus of claim 8 wherein said registration pulses are adapted to decrement the count of said first counter means.

11. The apparatus of claim 6 further comprising third counter means;

means responsive to each field sync signal for advancing the count of said third counter means; and means responsive to each line sync signal for loading the contents of said third counter means into said second counter means.

12. The apparatus of claim 11 wherein said second counter means further comprises means responsive to said image data for decrementing said second counter means; and means responsive to said second counter means reaching a predetermined count for preventing the transfer of further image data to said conversion means.

13. The apparatus of claim 11 further comprising settable means for selectively setting a predetermined count in said third counter means.

14. The apparatus of claim 11 further comprising means responsive to the count in said third counter means for terminating a printing operation.

15. The apparatus of claim 11 further comprising extraction means for extracting the field sync signals from said composite signal for application to said third counter means.

16. The apparatus of claim 6 further comprising means responsive to said first counter means reaching a predetermined count for resetting said first counter means to thereby prevent a predetermined number of lines from being printed.

17. The apparatus of claim 6 further comprising switch means for initiating a printing operation;

means responsive to operation of said switch means for initiating a printing cycle.

18. The apparatus of claim 6 further comprising input means for receiving said TV-type signals, cable means for coupling the TV-type signals to said input means; said input means comprising means for matching the impedance of the incoming cable coupled to said input means and digitizing means for digitizing the signals coupled thereto.

19. The apparatus of claim 18 wherein said digitizing means comprises differential amplifier means.

20. The apparatus of claim 19 further comprising means for applying a threshold level to one input of said differential amplifier means, said cable being coupled to a second input of said differential amplifier means.

21. The apparatus of claim 6 further comprising extraction means for receiving said composite signal and for extracting the line sync signals for application to said first counter means.

22. The apparatus of claim 6 wherein said conversion means comprises multi-stage shift register means having an input for receiving image data and having outputs coupled to the data inputs of said memory means.

23. The apparatus of claim 6 wherein said line sync signals are adapted to increment the count of said first counter means.

* * * * *